United States Patent
Ebner et al.

(10) Patent No.: US 9,322,466 B2
(45) Date of Patent: Apr. 26, 2016

(54) TRANSFER CASE WITH A REGULATED LUBRICATION

(71) Applicant: MAGNA Powertrain AG & Co KG, Lannach (AT)

(72) Inventors: Philipp Ebner, Graz (AT); Johannes Quehenberger, Saalbach (AT)

(73) Assignee: MAGNA Powertrain AG, Lannach (AT)

( * ) Notice: Subject to any disclaimer, the term of this patent is extended or adjusted under 35 U.S.C. 154(b) by 234 days.

(21) Appl. No.: 14/044,854

(22) Filed: Oct. 2, 2013

(65) Prior Publication Data

US 2014/0094333 A1   Apr. 3, 2014

(30) Foreign Application Priority Data

Oct. 2, 2012  (DE) .......................... 10 2012 218 054

(51) Int. Cl.
  *F16H 57/04*  (2010.01)
  *F16H 57/05*  (2006.01)
  *B60K 17/344*  (2006.01)

(52) U.S. Cl.
  CPC .......... *F16H 57/0427* (2013.01); *F16H 57/045* (2013.01); *F16H 57/0447* (2013.01); *F16H 57/0457* (2013.01); *F16H 57/05* (2013.01); *B60K 17/344* (2013.01)

(58) Field of Classification Search
  CPC .............. F16H 57/0412; F16H 57/042; F16H 57/0427; F16H 57/0447; F16H 57/045; F16H 57/0457
  USPC ......................................... 184/6.12
  See application file for complete search history.

(56) References Cited

U.S. PATENT DOCUMENTS

| | | | | |
|---|---|---|---|---|
| 1,225,840 | A * | 5/1917 | Mayer et al. ................... | 184/6.5 |
| 3,864,875 | A * | 2/1975 | Hewitt ............... | 49/115 |
| 4,217,926 | A * | 8/1980 | Van Gorder .................. | 137/389 |
| 4,630,711 | A * | 12/1986 | Levrai et al. ................. | 184/6.12 |
| 5,634,530 | A * | 6/1997 | Maekawa et al. ............ | 184/6.12 |
| 5,749,439 | A * | 5/1998 | Van Maanen ............... | 184/6.12 |
| 6,299,561 | B1 * | 10/2001 | Kramer et al. ............... | 475/160 |
| 6,644,439 | B2 * | 11/2003 | Schnitzer ..................... | 184/11.1 |
| 8,672,094 | B2 * | 3/2014 | Quehenberger ............. | 184/6.12 |
| 2002/0053489 | A1 * | 5/2002 | Schnitzer ..................... | 184/6.12 |

FOREIGN PATENT DOCUMENTS

| | | | |
|---|---|---|---|
| DE | 102007057984 | * | 6/2009 |
| DE | 102007057984 | A1 | 6/2009 |
| DE | 102011108042 | A1 | 1/2012 |
| WO | 2012038022 | A1 | 3/2012 |
| WO | 2014001264 | A1 | 1/2014 |

OTHER PUBLICATIONS

English machine translation of DE102007057984.*

* cited by examiner

*Primary Examiner* — William E Dondero
*Assistant Examiner* — Mark K Buse
(74) *Attorney, Agent, or Firm* — Jordan IP Law, LLC; Todd A. Vaughn

(57) ABSTRACT

A distribution gear mechanism with a torque transmission device having a clutch, a fluid sump configured to receive a lubricating fluid, wherein a lower cog is configured to engage in the fluid sump such that the lubricating fluid is conveyed from the fluid sump in the direction of an upper cog by way of a chain drive, a fluid reservoir configured to collect the lubricating fluid and which is fluidically connected to the fluid sump, an adjustment mechanism configured to open and close an outlet opening of the fluid reservoir to the fluid sump, and an actuating mechanism configured to simultaneously activate the adjustment mechanism and the clutch.

16 Claims, 4 Drawing Sheets

TRANSFER CASE WITH A REGULATED LUBRICATION

CROSS-REFERENCE TO RELATED APPLICATIONS

The present application claims priority 35 U.S.C. §119 to German Patent Publication No. DE 10 2012 218 054.0 (filed on Oct. 2, 2012), which is hereby incorporated by reference in its entirety.

TECHNICAL FIELD

Embodiments relate to a distribution gear mechanism with an input shaft, a first output shaft and a second output shaft, a torque transmission device having a clutch configured to distribute optionally to the first output shaft and the second output shaft a drive moment which is introduced via the input shaft. A chain drive or gear stages are active between the torque transmission device and the second output shaft, a lower cog is configured to engage in an fluid sump with lubricating fluid which may be conveyed from the fluid sump in a direction of the upper cog by way of the chain drive or gear stages. An fluid reservoir is provided to collect the lubricating fluid, with an outlet opening which may be closed by an adjustment mechanism which opens into the fluid sump.

BACKGROUND

Distribution gear mechanisms in a motor vehicle serve for variable distribution of the drive moment to the two vehicle axles. For this, the distribution gear mechanism has an input shaft, a first output shaft and a second output shaft. The input shaft is connected to a drive unit of the motor vehicle, such as, for example, an internal combustion engine. The first output shaft is connected via a first axle differential to a first axle of the motor vehicle, such as, for example, the rear axle. The second output shaft is connected via a second axle differential to a second axle of the motor vehicle, such as, for example the front axle.

The distribution gear mechanism further includes a torque transmission device having a clutch in order to distribute optionally to the first output shaft and the second output shaft a drive moment which is introduced via the input shaft. For example, the first output shaft may be formed integrally with or connected rotationally fixedly to the input shaft, in which a friction clutch variably couples the input shaft optionally also to the second output shaft. Alternatively, it is possible for example for the torque transmission device to include an intermediate axle differential gear mechanism, in which a friction clutch is active between the input shaft and one of the two output shafts (or between both output shafts) in order to block the intermediate axle differential gear mechanism optionally in a variable manner.

The input shaft and the second output shaft are usually arranged at different heights, wherein an offset drive is provided between the torque transmission device and the second output shaft. This offset drive may be formed as a chain drive having a lower sprocket and an upper sprocket which are connected via a chain. The lower sprocket is coupled rotationally fixedly with the second output shaft. The upper sprocket is coupled rotationally fixedly with an output element of the torque transmission device. Alternatively, the connection is created via gear stages.

In order for the distribution mechanism not to require its own oil pump, the chain of the chain drive may serve as an oil conveyor device. For this, the lower sprocket engages in an oil sump which is filled with lubricating oil, in which lubricating oil is conveyed from the oil sump in the direction of the upper sprocket by means of the chain. At the upper end of the chain drive, the lubricating oil is flung off the chain and may then, for example, be captured by a capture device and from there conducted in the direction of the lubrication points (e.g., friction clutch and bearings).

One disadvantage of known distribution gear mechanisms is that the lower sprocket engaging in the oil sump, or the bottom gear stage, which is guided through the oil sump, causes undesirable splash losses, i.e., the drag moment occurring in the oil sump reduces the efficiency of the distribution gear mechanism. Also, as a result the temperature of the lubricating oil in the oil sump is increased so that the cooling effect of the lubricating oil is reduced.

WO 2012/038022 discloses a distribution gear mechanism which has an outlet opening in the oil reservoir which opens into the oil sump, in which the chain is arranged at the outlet opening of the oil reservoir such that the chain chokes the outflow of lubricating oil, which has collected in the oil reservoir, into the oil sump. The actuator here is not connected to a clutch.

SUMMARY

In view of constantly growing demands for energy efficiency of a motor vehicle, embodiments provide a distribution gear mechanism of the type described above having a robust and reliable construction which reduces losses due to the splashing of the chain drive in the fluid, and which allows simple construction due to the dual use of an fluid pump.

Advantageously, embodiments relate to an adjustment mechanism configured to control the fluid level and a clutch which may be activated simultaneously with the adjustment mechanism by an actuating mechanism, such as, for example, a hydraulic-type actuating mechanism.

Advantageously, the actuating mechanism in accordance with embodiments may be an fluid pump, the suction side of which is operatively connected to the adjustment mechanism. It is advantageous if the fluid pump is operatively connected to the adjustment mechanism via a non-return valve.

It is advantageous if the adjustment mechanism contains an actuator which is configured to act on a flap which may also be activated by a bias mechanism such as, for example, a spring.

In accordance with embodiments, a distribution gear mechanism may include at least one of the following: an input shaft; a first output shaft; a second output shaft; a torque transmission device having a clutch configured to distribute to the first output shaft and the second output shaft a drive moment which is introduced via the input shaft; a chain drive between the torque transmission device and the second output shaft; a fluid sump configured to receive a lubricating fluid, wherein a lower cog is configured to engage in the fluid sump and lubricating fluid may be conveyed from the fluid sump in the direction of an upper cog by way of the chain drive; a fluid reservoir is configured to collect the lubricating fluid; an adjustment mechanism configured to close an outlet opening of the fluid reservoir which is fluidically connected to the fluid sump; and an actuating mechanism configured to simultaneously activate the adjustment mechanism and the clutch.

In accordance with embodiments, a distribution gear mechanism may include at least one of the following: a torque transmission device having a clutch; a fluid sump configured to receive a lubricating fluid, wherein a lower cog is configured to engage in the fluid sump and the lubricating fluid may be conveyed from the fluid sump in the direction of an upper cog by way of a chain drive; a fluid reservoir configured to collect the lubricating fluid and which is fluidically connected to the fluid sump; an adjustment mechanism configured to open and close an outlet opening of the fluid reservoir to the fluid sump; and an actuating mechanism configured to simultaneously activate the adjustment mechanism and the clutch.

In accordance with embodiments, a distribution gear mechanism may include at least one of the following: a clutch; a fluid sump; a fluid reservoir configured to collect lubricating fluid and which is fluidically connected to the fluid sump; an actuating mechanism operatively connected to the clutch and the adjustment mechanism and configured to simultaneously activate the adjustment mechanism and the clutch; a shut-off mechanism configured to fluidically connect and disconnect the fluid reservoir and the fluid sump; and a shut-off actuator configured to actuate the shut-off mechanism.

DRAWINGS

Embodiments will be illustrated by way of example in the drawings and explained in the description below.

DESCRIPTION

Figure 1:
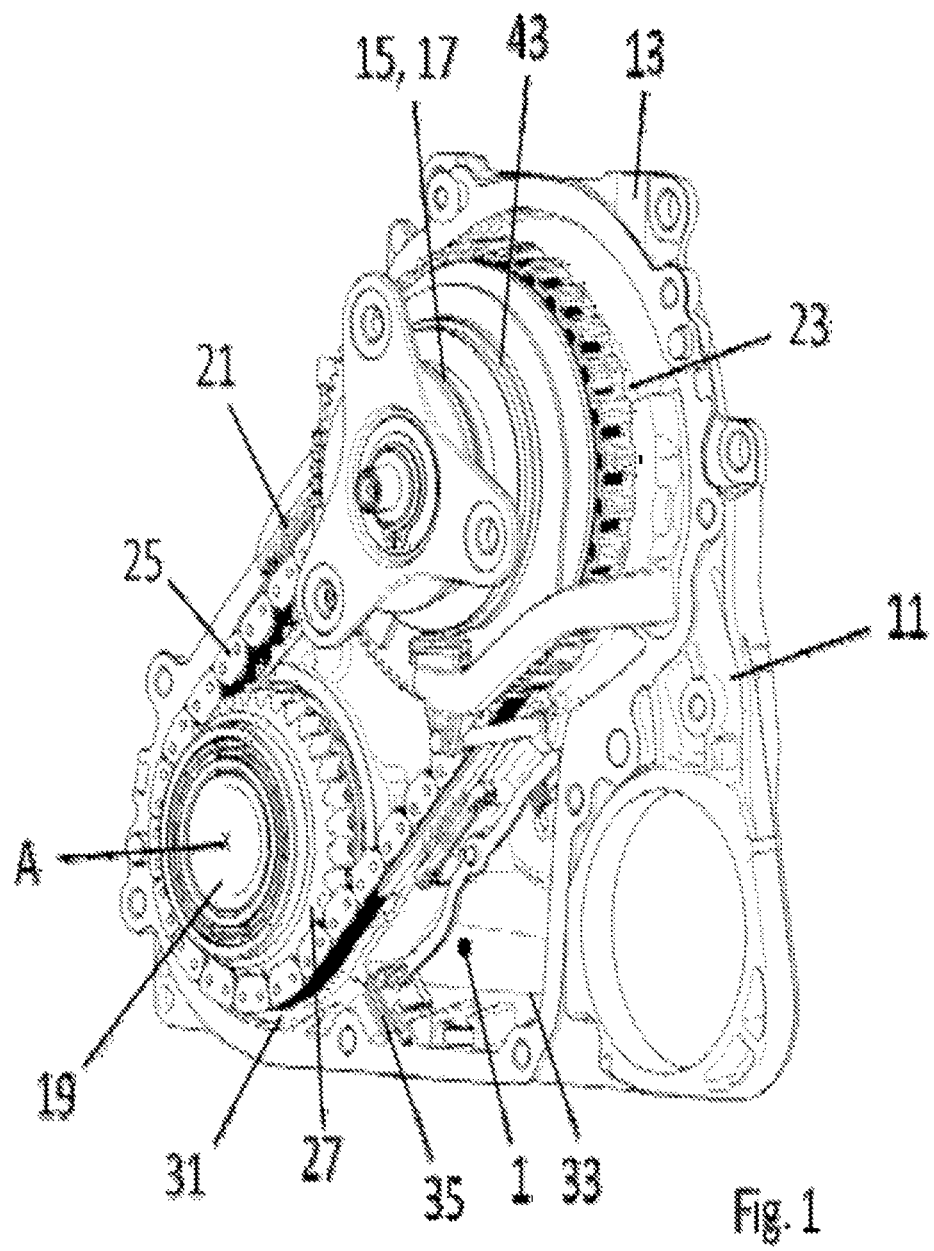
FIG. 1 illustrates a distribution gear mechanism with a closure mechanism, in accordance with embodiments.

As illustrated in FIG. 1, a distribution gear mechanism in accordance with embodiments has a two-piece housing, of which only one half of the housing 11 is illustrated. The housing 11 has a flange face 13 on which a corresponding flange face of the other housing half lies in a mounted state.

An input shaft 15 is rotatably mounted in the housing 11 by way of a roller bearing. The input shaft 15 is operatively connected by force fit to a drive unit of a motor vehicle, such as, for example, to the output element of a main gear mechanism which is associated with an internal combustion engine. The input shaft 15 may be formed integrally with a first output shaft 17. The first output shaft 17 may be operatively connected, for example, by force fit to an axle differential of the rear axle of the motor vehicle.

A second output shaft 19 is rotatably mounted in the housing 11 so as to be spatially offset and parallel to the input shaft 15. The second output shaft 19 may be spatially positioned below the input shaft 15. The second output shaft 19 may be operatively connected by force fit to an axle differential of the front axle of the motor vehicle.

Using a friction clutch, a portion of the drive moment introduced via the input shaft 15 may be transmitted optionally to the second output shaft 19, and hence, to the front axle of the motor vehicle. For this, a chain drive 21 may be active between the friction clutch and the second output shaft 19. A first part of the friction clutch is fixedly connected rotationally to the input shaft 15, and a second part of the friction clutch is fixedly connected rotationally to an upper sprocket 23 of the chain drive 21. The upper sprocket 23 is operatively connected via a chain 25 to a lower sprocket 27. The lower sprocket 27 is fixedly connected rotationally to the second output shaft 19.

The lower sprocket 27 and the portion of the chain 25 lying on the lower sprocket 27 engage in an fluid sump 31, such as, for example, an oil sump. The fluid sump 31 at a bottom region forms the housing half 11 and is filled with a lubricating fluid, such as, for example, a lubricating oil. The lubricating fluid serves to lubricate and/or cool components of the distribution gear mechanism, in particular to lubricate and cool the plates of the friction clutch. In the operation of the distribution gear mechanism, the lubricating fluid in the fluid sump 31 may be carried by the chain 25 along a chain duct 29 in the direction of the upper sprocket 23. In the region of the upper sprocket 23, the carried lubricating fluid may, for example, be flung off or scraped off, in which the lubricating fluid is then supplied via a suitable supply device, for example, via a channel, to the friction clutch and where applicable further lubrication points (e.g., bearings).

In addition to the fluid sump 31, a fluid reservoir 33 may be formed in the housing 11. The fluid reservoir 33 serves to collect the lubricating fluid which flows or is otherwise conducted completely or largely into the fluid reservoir 33 via a suitable return device (e.g., fluid channel or fluid line) after suitable lubricating and cooling of the friction clutch (and where applicable, the bearings). The fluid reservoir 33 is arranged radially offset to the fluid sump 31 in relation to the rotary axis A of the lower sprocket 27.

Advantageously, in accordance with embodiments, the clutch in the distribution gear box may be actuated by a common fluid pump, and thus, multiple functions, such as, for example, "closing the clutch" and "increasing the fluid level in the fluid sump," may be performed simultaneously in communicating pressure conditions.

Figure 2:
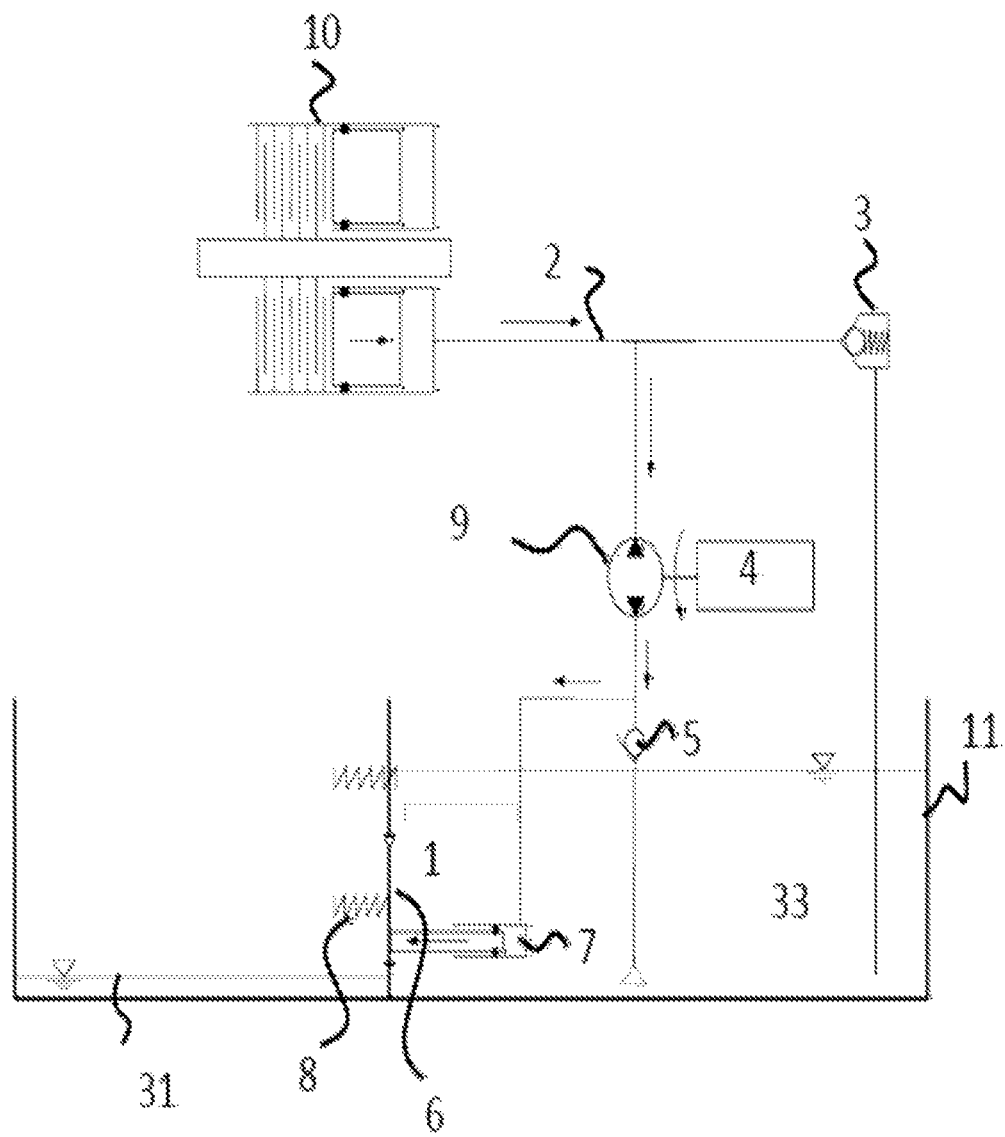
FIG. 2 illustrates a hydraulic-type actuating mechanism in a first phase, in accordance with embodiments.

FIG. 2 illustrates a diagrammatic structure of a hydraulic-type actuating mechanism with a clutch 10 which is operatively connected to a fluid pump 9 via a connection 2. The suction side of the fluid pump 9 is operatively connected to an actuator 7 which acts on a shut-off mechanism 1. The shut-off mechanism 1 in accordance with embodiments has a flap 6 which is operatively connected to a bias mechanism 8, such as, for example, a spring 8. The flap 6, under force of the bias mechanism 8 which engages it, closes the fluid reservoir of the housing 11 against the fluid sump 31. Parallel to the intake line is a connection via an overpressure valve 3 between the clutch 10 and the fluid reservoir 33.

If no moment is required at the clutch 10, the fluid pump 9 may be operated in the direction illustrated in the drawing, and hence, may pump fluid from the clutch 10 in the direction of the suction side. A non-return valve arranged in the suction line allows pressure to build up on the suction side, and the fluid pump thus operates the actuator 7 on the shut-off mechanism 1. The fluid level in the fluid sump 31 is therefore low, whereas the fluid level in the housing 11 is high. As a result the splash losses in the fluid sump are advantageously minimized. Only a small volume of fluid is conveyed, but this is not necessary if the clutch 10 is open and need not be lubricated.

Figure 3:
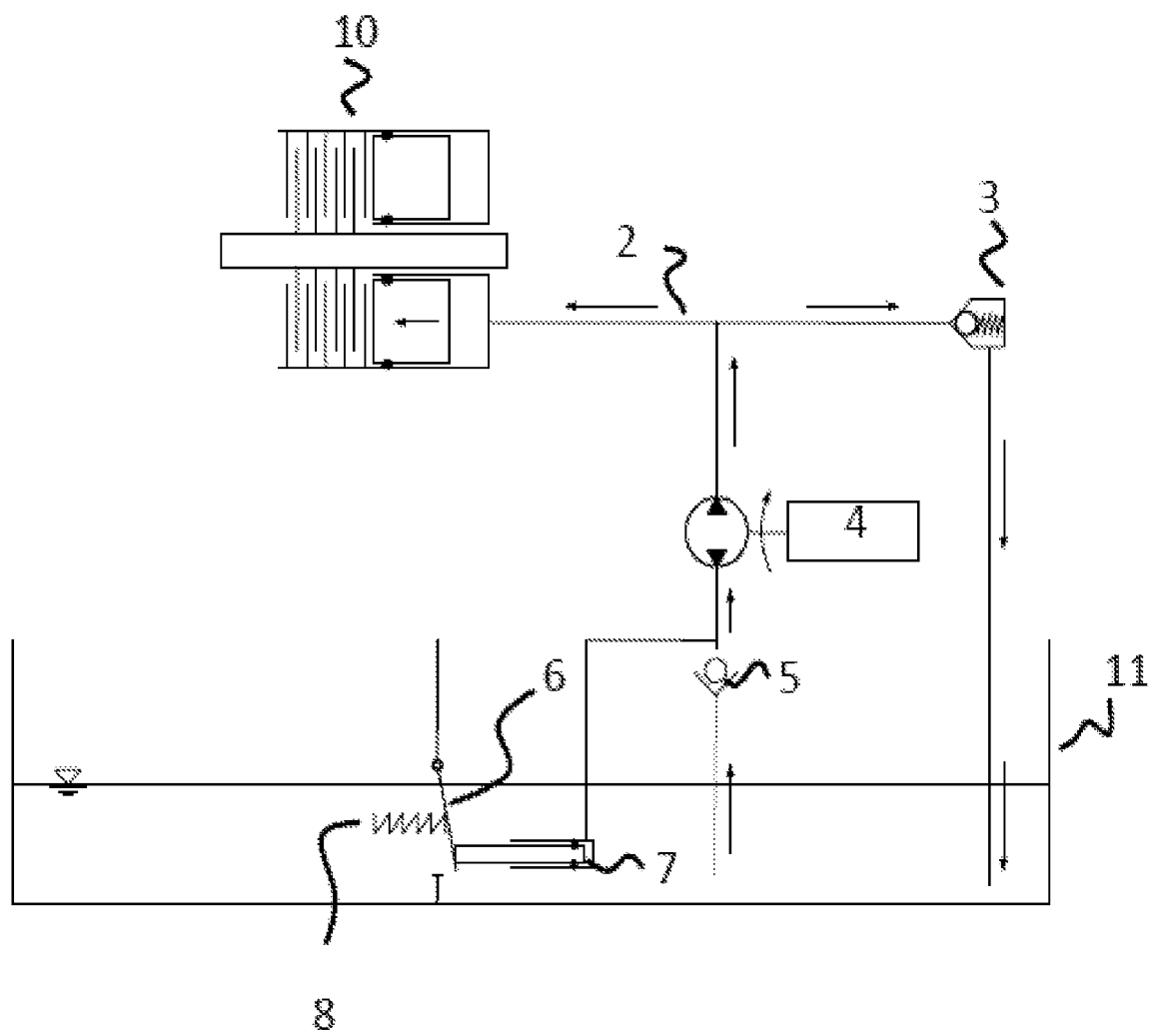
FIG. 3 illustrates an a hydraulic-type actuating mechanism in a second phase, in accordance with embodiments.

If a moment is now again required at the clutch, the working direction of the pump 9 is again reversed, the pressure in the suction line falls and the actuator is deactivated, as illustrated in FIG. 3. If now the clutch 10 is activated or switched, the fluid pump 9 pumps fluid in the direction of clutch 10 which is thus closed.

Due to the power of the pump 9 in the direction of the clutch 10, the pressure in the suction line falls and the actuator 7 is deactivated. The shut-off mechanism 1 opens the fluidic connection between the fluid capture chamber and the fluid sump 31. The fluid collected flows to the chain 25 or the cog and is now available for cooling the clutch 10 and lubricating components.

Figure 4:
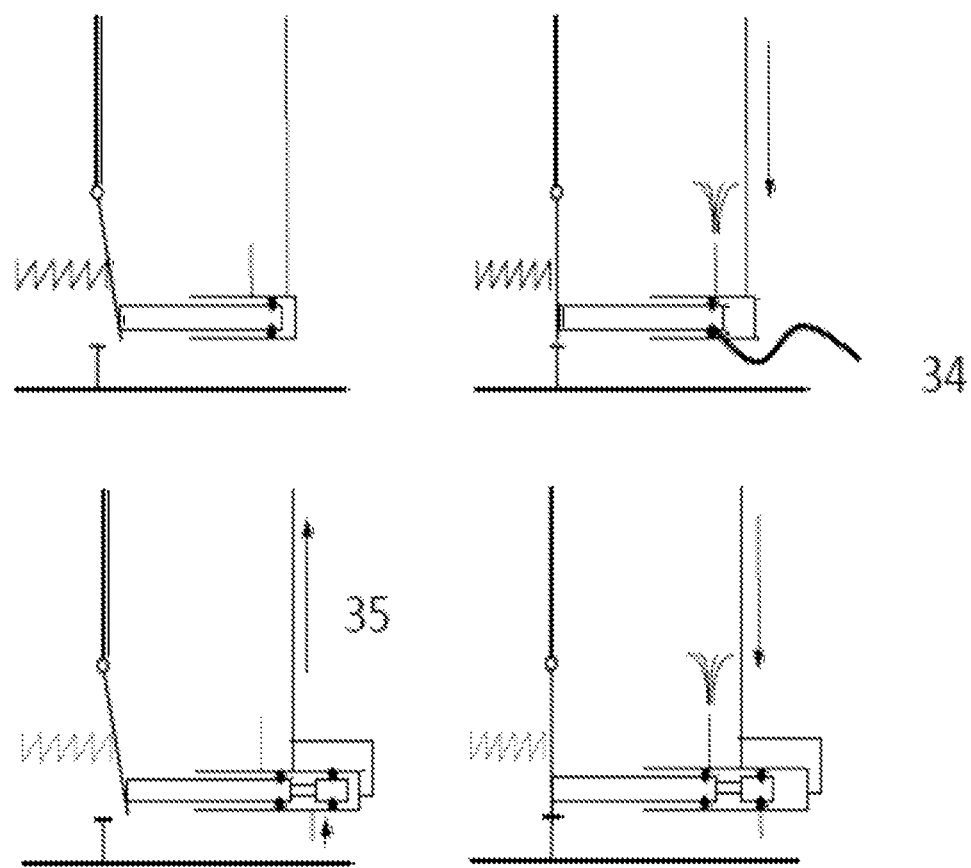
FIG. 4 illustrates a closure mechanism in accordance with embodiments.

In order not to overload the motor-pump unit on reverse rotation, and to guarantee reliably the rotation of the pump 9 in the opening direction, an overflow device 34 may be provided on the piston of the actuator. The upper part of FIG. 4 illustrates the overflow device 34 diagrammatically. The overflowing fluid may be guided directly to the fluid reservoir 33 or also in a targeted manner to the components to be supplied or to a filter. The latter embodiment is not illustrated further in the drawing. If the bias mechanism 8 of the flap 6 generates a sufficiently high back pressure, the pressure may support the reclosing and moment build-up of the clutch 10.

The non-return valve may be omitted if the piston on the flap 6 actuator allows a travel-dependent fluid flow 35 in the direction of the pump 9, as illustrated in the lower part of FIG. 4.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological signifimayce unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims

LIST OF REFERENCE SIGNS

1 Closure mechanism
2 Clutch supply
3 Overpressure valve
4 Electric motor
5 Non-return valve
6 Flap
7 Actuator
8 Spring
9 Fluid pump
10 Clutch
11 Housing half
13 Flange surface
15 Input shaft
17 First output shaft
19 Second output shaft
21 Chain drive
23 Upper sprocket
25 Chain
27 Lower sprocket
29 Chain duct
31 Fluid sump
33 Fluid reservoir
34 Overflow
35 Fluid stream

What is claimed is:

1. A distribution gear mechanism comprising:
   a torque transmission device having a clutch;
   a fluid sump configured to receive a lubricating fluid, wherein a lower cog is configured to engage in the fluid sump such that the lubricating fluid is conveyed from the fluid sump in the direction of an upper cog by way of a chain drive;
   a fluid reservoir configured to collect the lubricating fluid, and which is fluidically connected to the fluid sump;
   a shut-off mechanism configured to open and close an outlet opening of the fluid reservoir to the fluid sump;
   a first actuating mechanism configured to act on the shut-off mechanism, the first actuating system having a piston comprising an overflow device configured to guide overflowing lubricating fluid out of the actuator; and
   a second actuating mechanism configured to simultaneously activate the first actuating mechanism and the clutch.

2. The distribution gear mechanism of claim 1, wherein the second actuating mechanism comprises a hydraulic actuating mechanism.

3. The distribution gear mechanism of claim 2, wherein the hydraulic actuating mechanism comprises a fluid pump.

4. The distribution gear mechanism of claim 3, wherein a suction side of the fluid pump is operatively connected to the first actuating mechanism.

5. The distribution gear mechanism of claim 4, wherein the piston is configured to move a hydraulic fluid stream in a direction of the fluid pump.

6. The distribution gear mechanism of claim 3, further comprising a non-return valve configured to operatively connect the fluid pump to the adjustment mechanism.

7. A distribution gear mechanism, comprising:
   a clutch;
   a fluid sump;
   a fluid reservoir configured to collect lubricating fluid and which is fluidically connected to the fluid sump;
   a shut-off mechanism having a flap configured to fluidically connect and disconnect the fluid reservoir and the fluid sump, and a bias mechanism operatively connected to the flap such that, under force of the bias mechanism, the flap closes the fluid reservoir from the fluid sump;
   a shut-off actuator configured to act on the shut-off mechanism;
   an actuating mechanism configured to simultaneously activate the shut-off actuator and the clutch.

8. The distribution gear mechanism of claim 7, further a lower sprocket operatively connected to the clutch and which is configured to engage in an fluid sump, wherein the fluid reservoir is arranged radially offset to the fluid sump in relation to a rotary axis of a lower sprocket of the distribution gear mechanism.

9. The distribution gear mechanism of claim 7, wherein the actuating mechanism comprises a pump.

10. The distribution gear mechanism of claim 9, a suction side of the pump is operatively connected to the shut-off actuator.

11. The distribution gear mechanism of claim 10, wherein the the flap is moveable via force of the bias mechanism between a first flap position which fluidically disconnects the fluid reservoir and the fluid sump and a second flap position which fluidically connects the fluid reservoir and the fluid sump.

12. The distribution gear mechanism of claim 10, further comprising a non-return valve configured to operatively connect the fluid pump to the shut-off mechanism.

13. The distribution gear mechanism of claim 12, wherein the non-return valve is arranged at the suction side of the pump and configured to allow a build-up of pressure to build up on the suction side such that the pump activates the shut-off actuator.

14. The distribution gear mechanism of claim 7, further comprising an overpressure valve arranged between the clutch and the fluid reservoir.

15. The distribution gear mechanism of claim 7, wherein the shut-off actuator has a piston which comprises an overflow device configured to guide overflowing lubricating fluid out of the actuator.

16. A distribution gear mechanism comprising:
- a torque transmission device having a clutch;
- a fluid sump configured to receive a lubricating fluid, and which is engaged by the torque transmission device;
- a fluid reservoir configured to collect the lubricating fluid and which is fluidically connected to the fluid sump;
- a shut-off actuator having:
  - a flap configured to close the fluid reservoir from the fluid sump, and
  - a bias mechanism operatively connected to the flap such that, under force of the bias mechanism, the flap closes the fluid reservoir from the fluid sump;
- a shut-off actuator configured to act on the shut-off mechanism, the shut-off actuator including a piston having an overflow device to guide overflowing lubricating fluid out of the distribution gear mechanism; and
- an actuating mechanism configured to simultaneously activate the shut-off actuator and the clutch.

\* \* \* \* \*